US009554360B2

(12) United States Patent
Uzunoglu et al.

(10) Patent No.: US 9,554,360 B2
(45) Date of Patent: Jan. 24, 2017

(54) APPARATUS AND METHOD FOR IMPROVING DATA THROUGHPUT OF A TUNE-AWAY OPERATION IN A WIRELESS COMMUNICATION SYSTEM

(71) Applicant: QUALCOMM Incorporated, San Diego, CA (US)

(72) Inventors: Meric Emre Uzunoglu, Solana Beach, CA (US); Jun Hu, San Diego, CA (US); Pavan C. Kaivaram, San Diego, CA (US); Kevin S. Seltmann, Carlsbad, CA (US); Ravindra Mahendrakumar Garach, Santa Clara, CA (US); Ammar Taiyebi Kitabi, San Diego, CA (US); Huang Lou, San Diego, CA (US); Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 14/297,979

(22) Filed: Jun. 6, 2014

(65) Prior Publication Data
US 2015/0358942 A1 Dec. 10, 2015

(51) Int. Cl.
H04W 72/02 (2009.01)
H04W 52/44 (2009.01)
(Continued)

(52) U.S. Cl.
CPC ............ *H04W 72/02* (2013.01); *H04L 47/801* (2013.01); *H04W 28/065* (2013.01);
(Continued)

(58) Field of Classification Search
None
See application file for complete search history.

(56) References Cited

U.S. PATENT DOCUMENTS 8,238,931 B1 * 8/2012 Sarkar .................. H04W 48/08
455/453
8,369,853 B1 * 2/2013 Sarkar ............... H04W 36/0083
370/352
(Continued)

FOREIGN PATENT DOCUMENTS

WO WO-2005018115 A1 2/2005

OTHER PUBLICATIONS

A. Jajszczyk, A Guide to the Wireless Engineering Body of Knowledge (WEBOK), John Wiley & Sons, Oct. 18, 2012.*
(Continued)

*Primary Examiner* — Faruk Hamza
*Assistant Examiner* — Cassandra C Decker
(74) *Attorney, Agent, or Firm* — Loza & Loza LLP

(57) ABSTRACT

Aspects of the present disclosure relate to wireless communication devices and methods configured to operate with multiple communication protocols in tune-away operations. Some aspects of the present disclosure may improve the legacy tune-away operations at an access terminal. An access terminal establishes a call utilizing a first communication protocol, tunes away from the call to receive cell signaling utilizing a second communication protocol, and tunes back to the call utilizing the first communication protocol. Following the tuning back, during a first predetermined number of subframes and if the size of a reverse link (RL) packet is smaller than a first packet size and larger than a second packet size, the access terminal forces the RL packet to be a low latency (LoLat) packet.

36 Claims, 13 Drawing Sheets

(51) Int. Cl.
*H04W 76/02* (2009.01)
*H04W 52/16* (2009.01)
*H04L 12/927* (2013.01)
*H04W 28/06* (2009.01)
*H04W 52/52* (2009.01)
*H04W 88/06* (2009.01)

(52) U.S. Cl.
CPC ........... *H04W 52/16* (2013.01); *H04W 52/44* (2013.01); *H04W 52/52* (2013.01); *H04W 76/025* (2013.01); *H04W 88/06* (2013.01)

(56) References Cited

U.S. PATENT DOCUMENTS

| | | | |
|---|---|---|---|
| 8,437,292 B1 * | 5/2013 | Wurtenberger | H04L 23/02 370/329 |
| 8,515,434 B1 | 8/2013 | Narendran et al. | |
| 8,570,951 B1 | 10/2013 | Rajurkar et al. | |
| 8,582,477 B2 | 11/2013 | Usuda et al. | |
| 8,892,141 B2 | 11/2014 | Quek et al. | |
| 9,002,398 B2 | 4/2015 | Furuskaer et al. | |
| 9,007,907 B1 | 4/2015 | Shetty et al. | |
| 9,220,126 B2 | 12/2015 | Ericson et al. | |
| 2004/0214591 A1 | 10/2004 | Lott et al. | |
| 2004/0218533 A1 | 11/2004 | Kim et al. | |
| 2004/0258139 A1 | 12/2004 | Namgoong et al. | |
| 2005/0058154 A1 | 3/2005 | Lee et al. | |
| 2005/0094595 A1 | 5/2005 | Saifuddin | |
| 2007/0173275 A1 | 7/2007 | Das et al. | |
| 2008/0049706 A1 * | 2/2008 | Khandekar | H04J 13/00 370/342 |
| 2008/0207249 A1 * | 8/2008 | Choi | H04W 52/12 455/522 |
| 2009/0201948 A1 * | 8/2009 | Patwardhan | H04L 69/324 370/474 |
| 2010/0167780 A1 | 7/2010 | Lott et al. | |
| 2012/0294173 A1 * | 11/2012 | Su | H04W 24/10 370/252 |
| 2013/0107780 A1 | 5/2013 | Choi et al. | |
| 2013/0114436 A1 | 5/2013 | Dural et al. | |
| 2013/0201850 A1 | 8/2013 | Swaminathan et al. | |
| 2013/0210484 A1 | 8/2013 | Jeenagala et al. | |
| 2013/0235843 A1 | 9/2013 | Gohari et al. | |
| 2013/0260761 A1 | 10/2013 | Walke et al. | |
| 2013/0303181 A1 | 11/2013 | Rajurkar et al. | |
| 2013/0303240 A1 | 11/2013 | Sanka et al. | |
| 2014/0010181 A1 | 1/2014 | Zhang et al. | |
| 2014/0044046 A1 | 2/2014 | Vangala et al. | |
| 2014/0064220 A1 | 3/2014 | Lundby | |
| 2015/0358859 A1 | 12/2015 | Uzunoglu et al. | |
| 2015/0358942 A1 | 12/2015 | Uzunoglu et al. | |

OTHER PUBLICATIONS

International Search Report and Written Opinion—PCT/US2015/029287—ISA/EPO—Aug. 18, 2015.

* cited by examiner

APPARATUS AND METHOD FOR IMPROVING DATA THROUGHPUT OF A TUNE-AWAY OPERATION IN A WIRELESS COMMUNICATION SYSTEM

TECHNICAL FIELD

The following relates generally to wireless communication, and more specifically, to tune-away operation improvements in a wireless communication system and similar methods.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power).

An access terminal may include a subscriber identity module (SIM), or in some examples, an application (e.g., SIM application) that runs on a universal integrated circuit card (UICC), which stores the identification information (e.g., international mobile subscriber identity) of the access terminal and the other information used to identify and authenticate the subscriber of the access terminal. The SIM, UICC, and/or the applications running on the UICC may be referred to as the SIM or SIM card in this disclosure. A multi-SIM access terminal holds two or more SIM cards (or runs two or more SIM applications), and allows the use of two or more services or subscriptions on the same access terminal. In one example, an access terminal has dual SIMs and allows both SIMs to be active simultaneously such that the access terminal can make calls using either SIM at any given time. A dual SIMs access terminal may be referred to as a dual SIM dual standby (DSDS) access terminal that operate both SIMs simultaneously but shares only one RF chain or transceiver between them. Using each SIM, the access terminal communicates with the corresponding wireless network using a particular communication protocol. Examples of the communication protocols include those defined by the 3rd Generation Partnership Project (3GPP), including Global System for Mobile Communications (GSM), Universal Mobile Telecommunications Systems (UMTS), Long-Term Evolution (LTE, also known as the Evolved Packet System or EPS); as well as those defined by the 3rd Generation Partnership Project 2 (3GPP2), including CDMA2000 1x. Evolution Data Optimized (EVDO), etc. Of course, those of ordinary skill in the art will recognize that any suitable communication protocol may be utilized within the scope of the present disclosure, without being limited to those examples described above.

An access terminal, while engaged in a call using a first communication protocol (e.g., EVDO), may perform tune-away operations, e.g., tuning to a channel of a second communication protocol (e.g., GSM or 1x) for every predetermined cycle or period. After receiving, for example, signaling on the second communication protocol, the access terminal tunes back to continue the call using the first communication protocol. The first communication protocol and second communication protocol may correspond to the same SIM or different SIMs. While performing these tune-away operations, however, the access terminal typically performs data ramp-down and ramp-up procedures for the first communication protocol traffic before and after tune-away. That is, before the tune-away, the access terminal reduces (ramp-down) its transmission packet sizes, and after the tune-away, the packet sizes are increased back up (ramp-up) again. The ramp-up and ramp-down operation may undesirably impact the data throughput of the call using the first communication protocol.

BRIEF SUMMARY OF SOME EXAMPLES

As mentioned above, the technology discussed in this specification relates to wireless communication devices and methods configured to operate with multiple communication protocols in tune-away operations. Some aspects of the present disclosure, as discussed in more detail below, may improve the legacy tune-away operations at an access terminal.

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

An aspect of the present disclosure provides a method of wireless communication operable at an access terminal. The access terminal establishes a call utilizing a first communication protocol. The access terminal tunes away from the call to receive cell signaling utilizing a second communication protocol. The access terminal tunes back to the call utilizing the first communication protocol. Following the tuning back, during a first predetermined number of subframes and if the size of a reverse link (RL) packet is smaller than a first packet size and larger than a second packet size, the access terminal forces the RL packet to be a low latency (LoLat) packet.

Another aspect of the present disclosure provides an apparatus for wireless communication. The apparatus includes means for establishing a call utilizing a first communication protocol. The apparatus further includes means for tuning away from the call to receive cell signaling utilizing a second communication protocol. The apparatus further includes means for tuning back to the call utilizing the first communication protocol. Following the tuning back, during a first predetermined number of subframes and if the size of a reverse link (RL) packet is smaller than a first packet size and larger than a second packet size, the apparatus further includes means for forcing the RL packet to be a low latency (LoLat) packet.

Another aspect of the present disclosure provides an access terminal for wireless communication. The access terminal includes a first communication component for wireless communication utilizing a first communication protocol and a second communication component for wireless communication utilizing a second communication protocol. The access terminal further includes a low latency (LoLat) packet forcing component and a tune-away control component operatively coupled to the first and second communication components. The tune-away control component is configured to utilize the first communication component to establish a call utilizing the first communication protocol, tune away from the call and utilize the second communication component to receive cell signaling utilizing the second communication protocol, and tune back to the call utilizing the first communication protocol. Following the tuning back, during a first predetermined number of subframes and if the size of a reverse link (RL) packet is smaller than a first packet size and larger than a second packet size, the access terminal further includes a low latency (LoLat) packet forcing component configured to force the RL packet to be a LoLat packet.

Another aspect of the present disclosure provides a computer-readable medium that includes code for causing an access terminal to perform various operations. The code causes the access terminal to establish a call utilizing a first communication protocol, tune away from the call to receive cell signaling utilizing a second communication protocol, and tune back to the call utilizing the first communication protocol. Following the tuning back, during a first predetermined number of subframes and if the size of a reverse link (RL) packet is smaller than a first packet size and larger than a second packet size, the code further causes the access terminal to force the RL packet to be a low latency (LoLat) packet.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of wireless communication systems, network architectures, and communication standards. Certain aspects of the discussions are described below for Code Division Multiple Access (CDMA) and 3rd Generation Partnership Project 2 (3GPP2) 1× and EVDO protocols and systems, and related terminology may be found in much of the following description. However, those of ordinary skill in the art will recognize that one or more aspects of the present disclosure may be employed and included in one or more other wireless communication protocols and systems.

Figure 1:
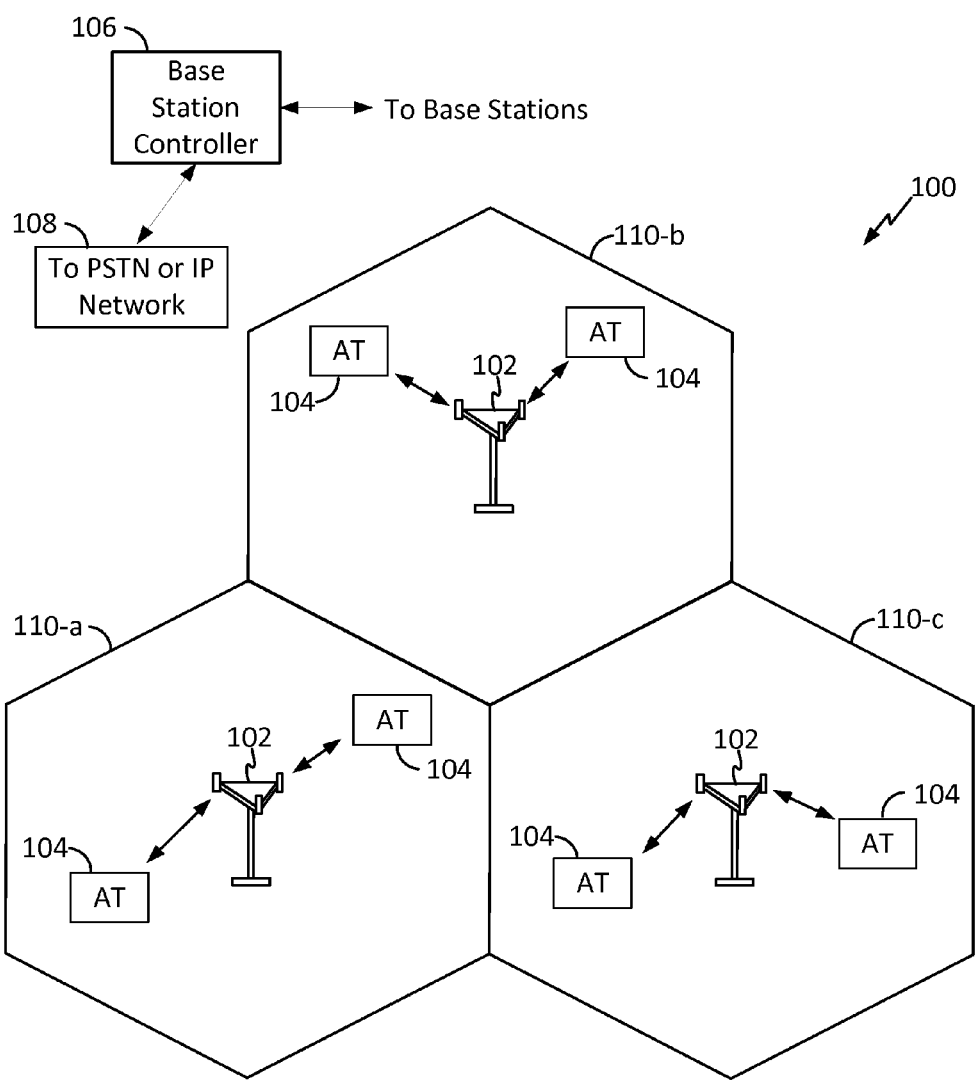
FIG. 1 is a block diagram illustrating an example of a network environment in which one or more aspects of the present disclosure may find application.

FIG. 1 is a block diagram illustrating an example of a network environment in which one or more aspects of the present disclosure may find application. The wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. A base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

The base stations 102 are configured to communicate with the access terminals 104 under the control of the base station controller 106 via multiple carriers. Each of the base stations 102 can provide communication coverage for a certain geographic area. The coverage area 110 for each base station 102 here is identified as cells 110-a, 110-b, or 110-c. The coverage area 110 for a base station 102 may be divided into sectors (not shown, but making up only a portion of the coverage area). In a coverage area 110 that is divided into sectors, the multiple sectors within a coverage area 110 can be covered by groups of antennas with each antenna responsible for communication with one or more access terminals 104 in a portion of the cell.

One or more access terminals 104 may be dispersed throughout the coverage area 110, and may wirelessly communicate with one or more cells or sectors associated with each respective base station 102. An access terminal (AT) 104 may generally include one or more devices or components that communicate with one or more other devices through wireless signals. Such access terminals 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. The access terminals 104 may include mobile terminals and/or at least substantially fixed terminals. Examples of access terminals 104 include mobile phones, smartphones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) devices, and/or other communication/computing devices which communicate, at least partially, through a wireless or cellular network.

Figure 2:
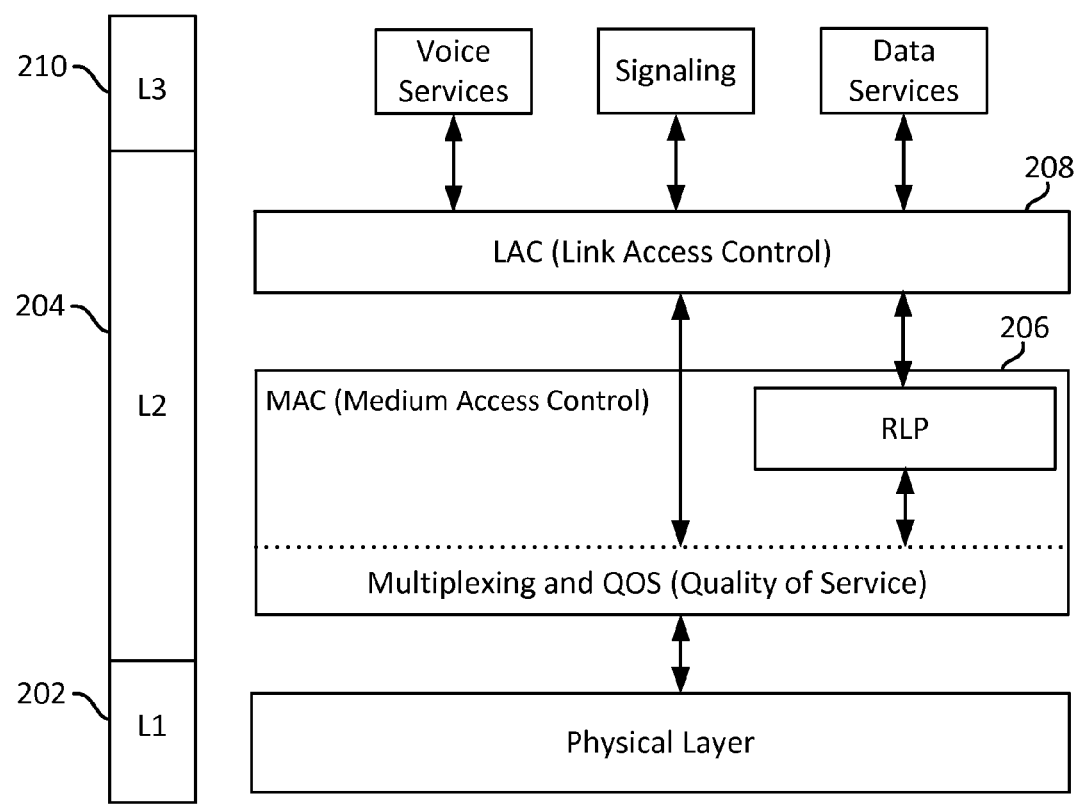
FIG. 2 is a block diagram illustrating an example of a protocol stack architecture, which may be implemented by an access terminal.

The access terminal 104 may be adapted to employ a protocol stack architecture for communicating data between the access terminal 104 and one or more network nodes of the wireless communication system 100 (e.g., the base station 102). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 2 is a block diagram illustrating an example of a protocol stack architecture which may be implemented by an access terminal 104. Referring to FIGS. 1 and 2, the protocol stack architecture for the access terminal 104 is shown to generally include three layers: Layer 1 (L1), Layer 2 (L2), and Layer 3 (L3).

Layer 1 202 is the lowest layer and implements various physical layer signal processing functions. Layer 1 202 is also referred to herein as the physical layer 202. This physical layer 202 provides for the transmission and reception of radio signals between the access terminal 104 and a base station 102.

The data link layer, called layer 2 (or "the L2 layer") 204 is above the physical layer 202 and is responsible for delivery of signaling messages generated by Layer 3. The L2 layer 204 makes use of the services provided by the physical layer 202. The L2 layer 204 may include two sublayers: the Medium Access Control (MAC) sublayer 206, and the Link Access Control (LAC) sublayer 208.

The MAC sublayer 206 is the lower sublayer of the L2 layer 204. The MAC sublayer 206 implements the medium access protocol and is responsible for transport of higher layers' protocol data units using the services provided by the physical layer 202. The MAC sublayer 206 may manage the access of data from the higher layers to the shared air interface.

The LAC sublayer 208 is the upper sublayer of the L2 layer 204. The LAC sublayer 208 implements a data link protocol that provides for the correct transport and delivery of signaling messages generated at the layer 3. The LAC sublayer makes use of the services provided by the lower layers (e.g., layer 1 and the MAC sublayer).

Layer 3 210, which may also be referred to as the upper layer or the L3 layer, originates and terminates signaling messages according to the semantics and timing of the communication protocol between a base station 102 and the access terminal 104. The L3 layer 210 makes use of the services provided by the L2 layer. Information (both data and voice) message are also passed through the L3 layer 210.

Figure 3:
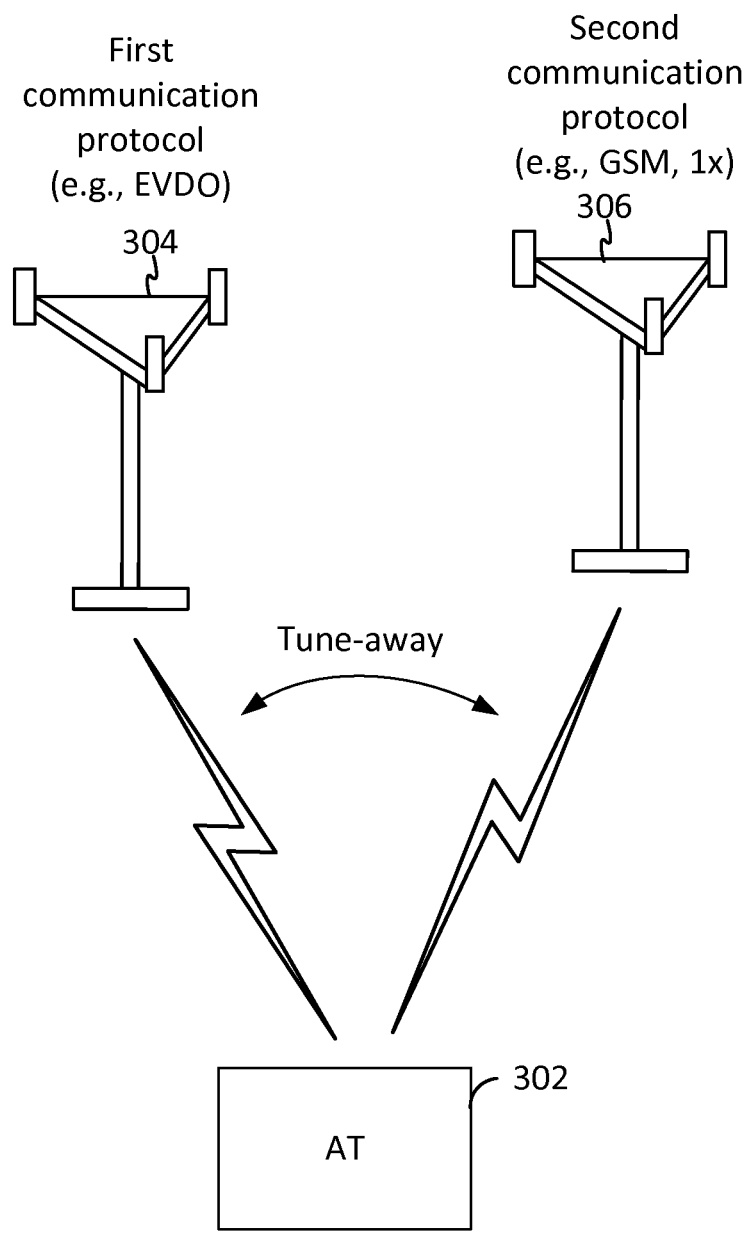
FIG. 3 is a block diagram illustrating an access terminal configured to support tune-away operations in accordance with aspects of the disclosure.

FIG. 3 is a block diagram illustrating an access terminal 302 configured to support tune-away operations in accordance with some aspects of the disclosure. For example, the access terminal 302 may be the same as the AT 104 of FIG. 1 or any AT illustrated in FIGS. 1, 12, and/or 13. The AT 302 may be simultaneously connected to a cell 304 and a second cell 306 using different communication protocols. The cells 304 and 306 may be associated with the same subscription or different subscriptions. In one aspect of the disclosure, the AT 302 may communicate with the first cell 304 by an EVDO protocol, and the second cell 306 by a GSM or CDMA2000 1× protocol. In one example, while engaged in EVDO traffic with the first cell 304, the AT 302 may perform a tune-away operation to receive GSM (or 1×) signaling from the second cell 306 for every page cycle. Because GSM paging occurs every 470 milliseconds (ms), the AT 302 will frequently tune away from the EVDO call to receive GSM signaling, which can cause frequent interruption to the EVDO call. This interruption can cause undesirable degradation to the EVDO data throughput.

Of course, those of ordinary skill in the art will recognize that the operation illustrated in FIG. 3 and described above is merely one example of an operation that may be referred to in the present disclosure as a tune-away operation. In general, a tune-away need not actually include any "tuning" of a transceiver or communication interface to utilize a new frequency. Rather, a tune-away operation may refer to such tuning to a new or different frequency, but may additionally or alternatively refer to a change from a first communication protocol utilizing one CDMA scrambling code to a second communication protocol utilizing a different CDMA protocol, or any other suitable change between different communication protocols.

Figure 4:
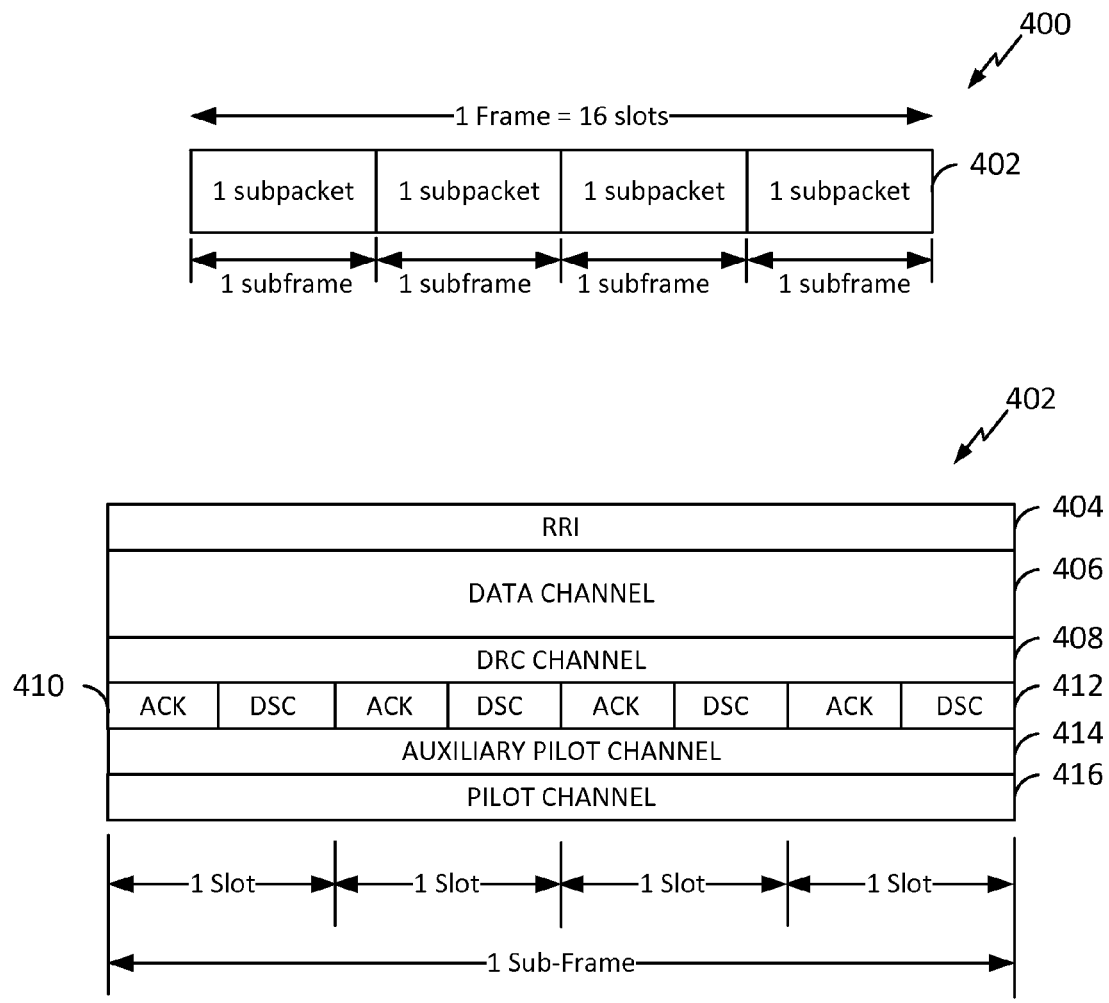
FIG. 4 is a conceptual diagram illustrating an example of EVDO reverse link traffic channel frame structure.

FIG. 4 is a conceptual diagram illustrating an example of EVDO reverse link (RL) traffic channel frame structure. In EVDO, an RL frame 400 has sixteen slots that are divided into four subframes. Each subframe takes up four slots and may be used to transmit one subpacket. A subpacket 402 is the smallest unit of a reverse traffic channel transmission that can be acknowledged at the physical layer by the access network (AN). A subpacket 402 is transmitted over four contiguous slots, thus a subpacket is transmitted in one subframe. Each physical layer packet can be transmitted in up to four subpackets. Code division multiplexing is used to simultaneously transmit multiple channels in the RL. For example, the channels are a Reverse Rate Indicator (RRI) channel 404, a data channel 406, a Data Rate Control (DRC) channel 408, an Acknowledgment (ACK) channel 410, a Data Source Channel (DSC) 412, an auxiliary pilot channel 414, and a pilot channel 416. The ACK 410 and DSC 412 are time-multiplexed together. The auxiliary pilot channel 414 is optional and is used at higher data rates.

The RRI 404 indicates the data rate of the reverse Data Channel. That is, the RRI 404 reports the data rate of the current RL data packet by utilizing one of a certain number of payload indexes, which may fall within a range of 1 to 12. The data channel 406 carries the user data (EVDO traffic). The DRC channel 408 contains a four bit word in each slot to allow the choice of different transmission rates to the serving sector. For example, there are 12 possible formats that the AT may request from the selected base station, called "DRC indices." Each DRC index includes a set of parameters for a transmission including a data rate, packet length, number of slots, coding rate, modulation type, preamble length, and repetition. Each transmission rate (or data rate) is a function of payload size and latency target. The latency target is the number of transmission subpackets used to achieve the desired packet error rate (PER), and can be 1, 2, 3, or 4 subpackets. The DRC channel 408 transmission utilizes a suitable cover code, called a DRC cover, which may be either a sector cover or a null cover. In general, DRC covers are associated with a particular sector in the AT's Active Set (called a "sector cover"). The AT uses the DRC channel 408 to ask a specific sector to transmit to the AT using a specific transmission rate or data rate. The ACK 410 is transmitted after the AT detects a frame (from the forward link) with a preamble indicating the AT to be the recipient of the data.

The DSC 412 provides a radio network controller (RNC) advance notice of the AT's intent to switch cell. Therefore, while the RNC is transitioning the data to the new cell, the AT can continue requesting data from its current cell. The DSC 412 is time-multiplexed with the ACK 410 and is always transmitted in the second half slot. The data channel 406 uses sub-frames to transmit sub-packets, where each sub-packet takes 4 slots.

Aspects of the present disclosure improve the legacy EVDO management algorithm (e.g., EVDO Reverse Traffic Channel MAC (RTC-MAC) Protocol), with the aim to lead to better RL (uplink) EVDO throughput performance during a tune-away operation, for example, between EVDO traffic and GSM/1× idle traffic. In general, as much as possible, larger RL packet sizes are utilized, before and after the tune-away operation. Therefore, the ramp-down (decrease packet size) and ramp-up (increase packet size) of RL packet sizes may be reduced or avoided before and/or after tune-away. To enable the tune-away operation to be performed properly without the ramp-down and ramp-up of packet sizes, certain changes to the RL data transmissions are made before and after the tune-away operation.

Figure 12:
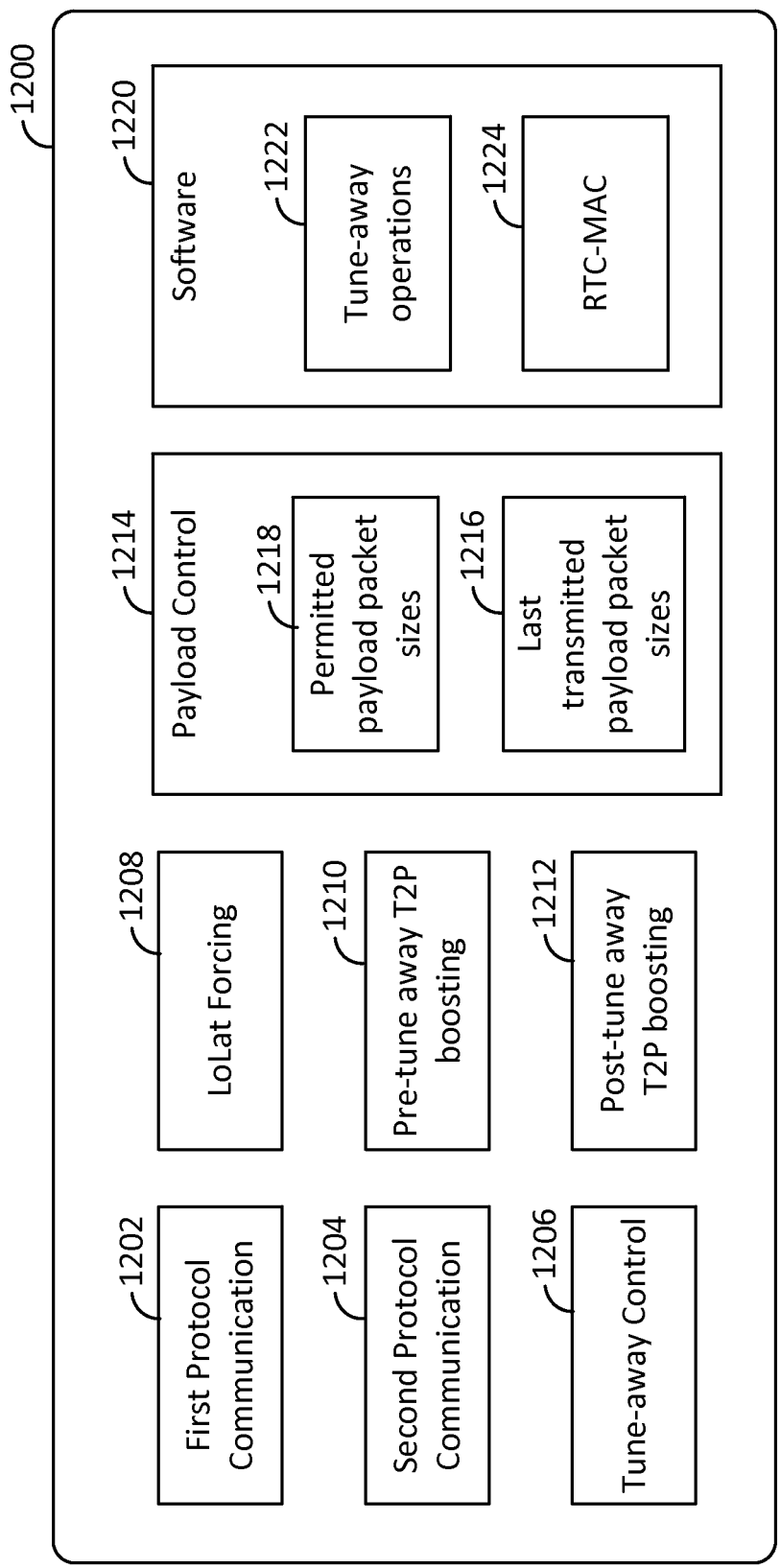
FIG. 12 is a block diagram illustrating an access terminal in accordance with an aspect of the disclosure.

The improved EVDO management algorithm includes a number of features, which may be implemented alone or in any suitable combinations at an AT 302 or any AT illustrated in FIGS. 1, 3, 12, and/or 13. These features will be described in detail below by way of some non-limiting examples. The AT 302 may transmit packets using two transmission modes: high capacity (HiCap) and low latency (LoLat). In general, LoLat has a termination target less than that of the HiCap.

In EVDO, for example, HiCap may have a termination target of 4 subpackets, while LoLat may have a termination target of 2 to 3 subpackets. The termination target controls the number of subpackets the AT 302 may attempt to transmit a packet under a given packet error rate (PER). By using LoLat transmission, the AT can minimize transmission delay and achieve a higher data rate.

Figure 5:
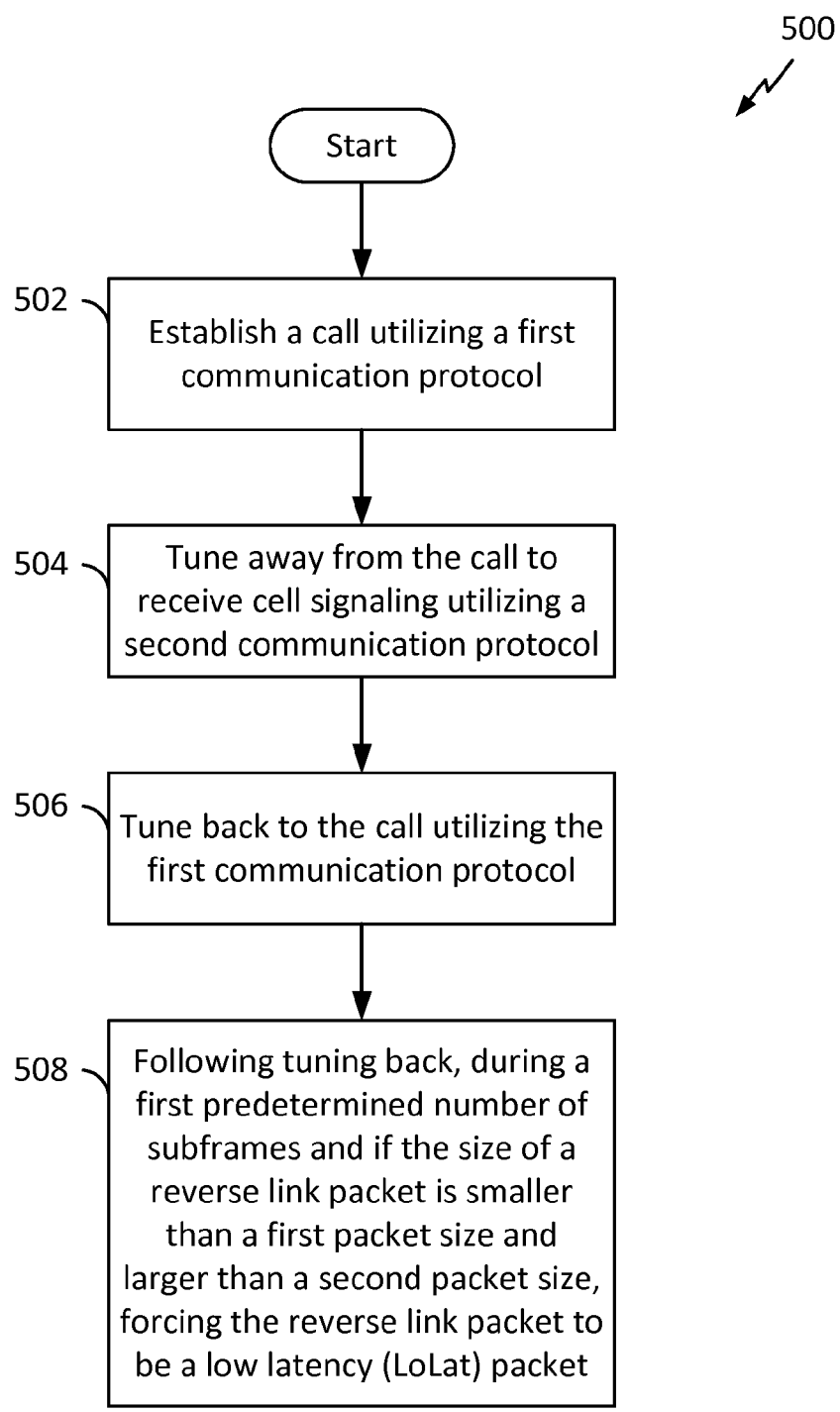
FIG. 5 is a flowchart illustrating a tune-away procedure utilizing low latency (LoLat) transmission forcing in accordance with an aspect of the disclosure.

In one aspect of the disclosure, the AT 302 may implement LoLat forcing after a tune-away operation in certain conditions. For example, the AT 302 may force packets configured for certain data rates to be LoLat packets for a certain period of time right after tune-away. FIG. 5 is a flowchart illustrating a tune-away procedure 500 utilizing LoLat forcing in accordance with an aspect of the disclosure. The tune-away procedure 500 may be performed by the AT 302 or any of the ATs illustrated in FIGS. 1, 3, 12, and/or 13. The AT 302 may be configured to perform a tune-away operation between two communication protocols, which may be associated with the same or different subscriptions. At block 502, the AT 302 establishes a call utilizing a first communication protocol. For example, the AT 302 may establish an EVDO call with a first cell 304 utilizing the EVDO protocol. At block 504, the AT 302 tunes away from the call to receive cell signaling utilizing a second communication protocol. For example, the AT 302 may tune away to a second cell 306 to receive signaling from the second cell 306 utilizing the GSM or 1× protocol. The cell signaling may include paging messages or other control messages. In one example, the AT 302 may tune away to receive GSM paging messages for every GSM paging cycle.

Figure 6:
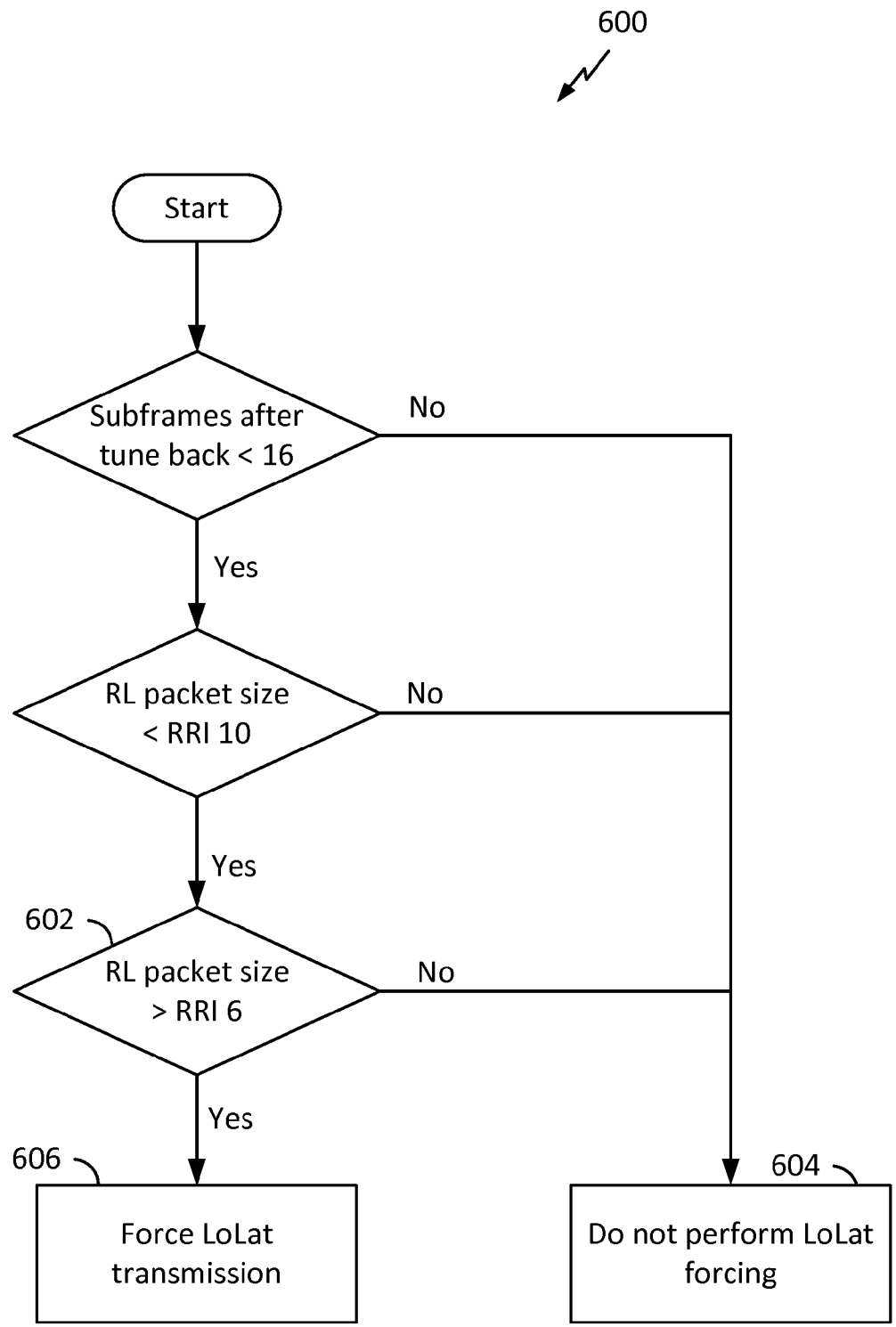
FIG. 6 is a flowchart illustrating a LoLat forcing procedure in accordance with an aspect of the disclosure.

At block 506, the AT 302 tunes back to the call utilizing the first communication protocol. At block 508, following tuning back, during a predetermined number of subframes and if the size of a reverse link (uplink) packet is smaller than a first packet size and larger than a second packet size, the AT 302 forces the reverse link packet to be a LoLat packet. In one example, referring to FIG. 6, a LoLat forcing procedure 600 is illustrated in detail. In one aspect of the disclosure, the procedure 600 may be performed at block 508 of FIG. 5 by the AT 302. After tuning back to an EVDO call, if it is still within a period of time less than 16 subframes (e.g., a first predetermined number of subframes such as 15 subframes or less) after tuning back and the current RL packet size is smaller than that of RRI payload index 10 (first packet size) (e.g., 6144 bits, EVDO packet size 10), the procedure 600 proceeds to block 602; otherwise, the procedure 600 proceeds to block 604. At block 604, the AT 302 does not force the packets to be transmitted as LoLat packets. At block 602, if the current RL packet size is larger than that of RRI payload index 6 (second packet size) (e.g., 1536 bits, EVDO packet size 6), the procedure 600 proceeds to block 606; otherwise, the procedure 600 proceeds to block 604. At block 606, the AT 302 forces LoLat transmission for RL packets with packet size, for example, equal to or larger than that of RRI payload index 7 (EVDO packet size 7).

In EVDO RL, there are a total of 6 channels per user: one traffic channel and five overhead channels including, for example, a pilot channel 416, a DRC channel 408, a DSC channel 412, an ACK channel 410, and an RRI channel 404. The pilot channel 406 is used for channel estimation of the air interface between the base station and the AT, and is used for power control purposes. Transmission power of the other channels are defined by channel gains with respect to the pilot channel. For the RL traffic channel, the transmit power is specified by a power gain called the traffic-to-pilot power gain (T2P). In general, the T2P is determined based on a reverse link transmission power level setpoint, which is determined based on one or more commands received from the base station. Each of the commands from the base station instructs the AT to increase or decrease the setpoint based on, for example, network conditions measured by the access network. The T2P that is determined based on the setpoint may be referred as the "original T2P" in this disclosure.

In one aspect of the disclosure, to ensure early termination of RL packets by the start of the tune-away, the AT 302 may boost the original T2P to increase the traffic channel transmit power for a given time prior to the tune-away. Boosting the T2P means increasing the transmit power of the RL from its original T2P. The AT 304 may send a packet to the base station in a number of attempts (e.g., up to four attempts or subpackets). For each transmission attempt, the base station responds with an acknowledgment (ACK) or a negative acknowledge (NACK). The ACK indicates successful receipt and decoding, while the NAK indicates failure to successfully receive and decode the subpacket. Boosting the T2P increases the likelihood that a subpacket is successfully received and decoded by the base station in a first attempt. If the AT 304 receives an ACK from the base station in response to the first attempt at transmitting a given packet, the AT 304 will not proceed with the additional attempts. Therefore, early termination of a multi-attempt cycle (e.g., 4 attempts) upon receipt of an ACK increases overall RL throughput.

Figure 7:
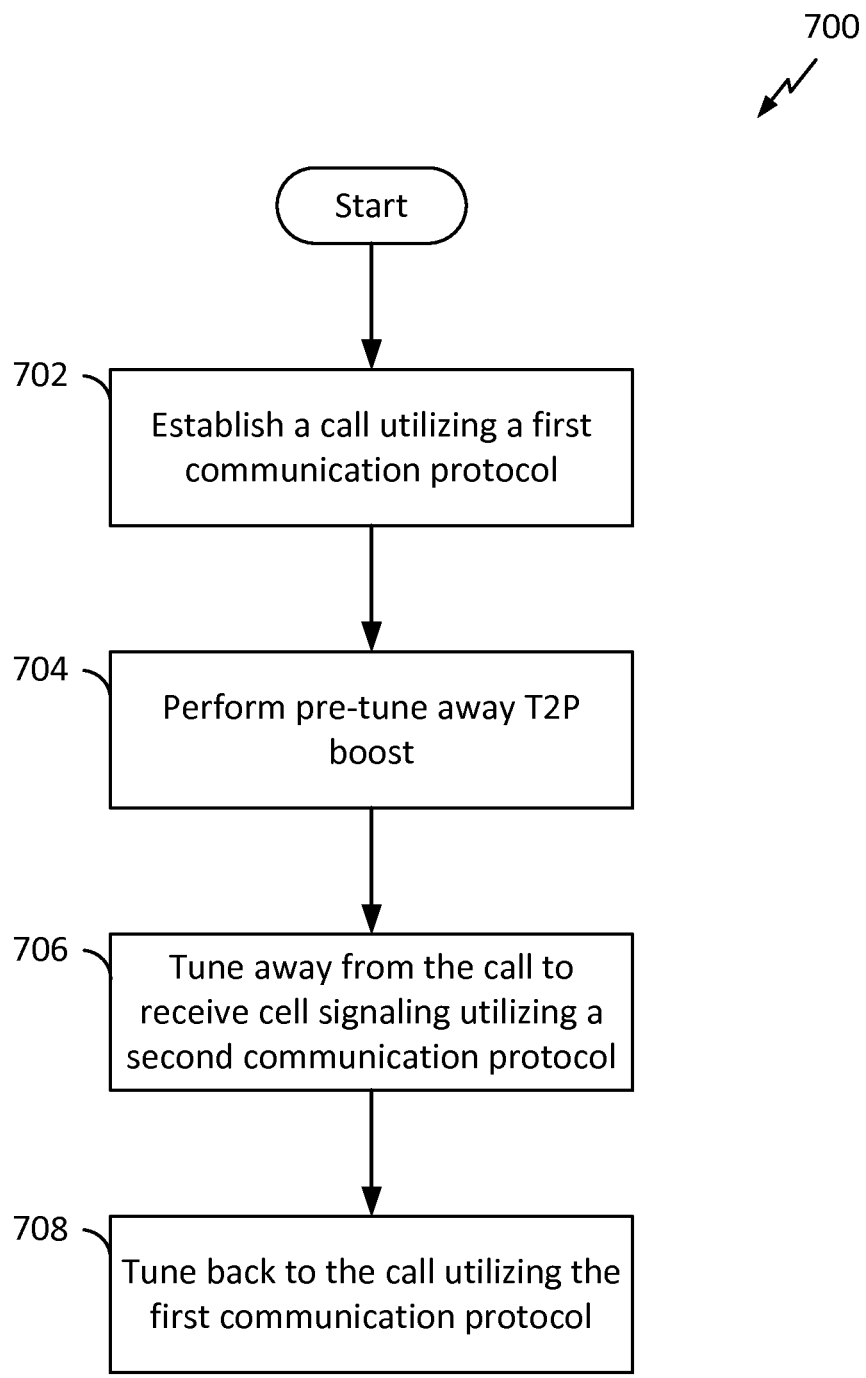
FIG. 7 is a flowchart illustrating a tune-away procedure utilizing pre-tune away traffic channel power boost in accordance with an aspect of the disclosure.

FIG. 7 is a flowchart illustrating a tune-away procedure 700 utilizing pre-tune away traffic channel power boost (T2P boost) in accordance with an aspect of the disclosure. For example, the procedure 700 may be performed by the AT 320 or any of the ATs illustrated in FIGS. 1, 3, 12, and/or 13. At block 702, the AT 302 establishes a call utilizing a first communication protocol. For example, the AT 302 may engage in an EVDO call with a first cell 304 utilizing the EVDO protocol. At block 704, the AT 302 performs pre-tune away T2P boost. At block 706, the AT 302 tunes away from the call to receive cell signaling utilizing a second communication protocol. For example, the AT 302 may tune away to a second cell 306 to receive cell signaling from the second cell 306 utilizing the GSM or 1x protocol. The cell signaling may include paging messages. At block 708, the AT 302 tunes back to the call utilizing the first communication protocol.

Figure 8:
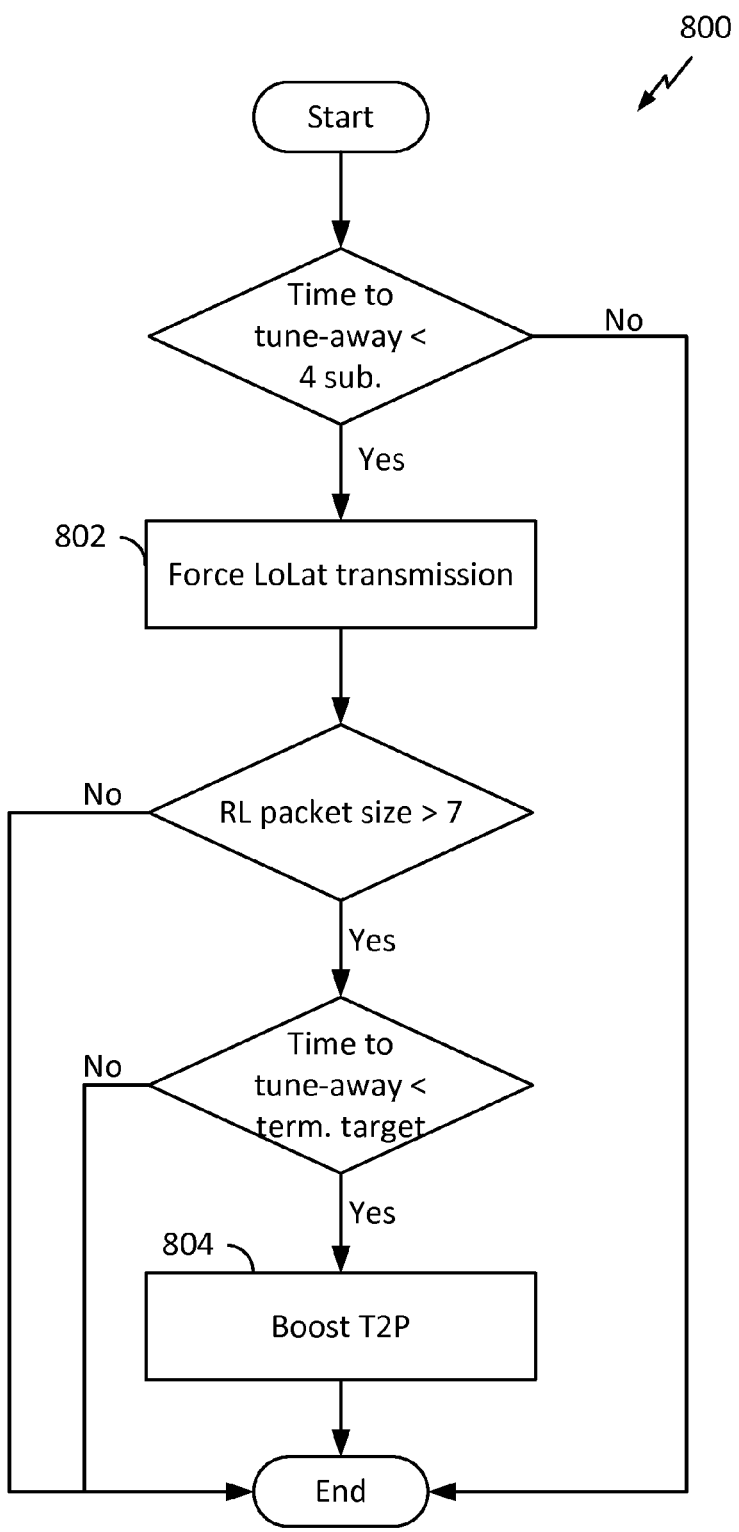
FIG. 8 is a flowchart illustrating a pre-tune away traffic channel power boost algorithm in accordance with an aspect of the disclosure.

FIG. 8 is a flowchart illustrating a pre-tune away T2P boost algorithm 800 in accordance with an aspect of the disclosure. For example, the algorithm 800 may be performed by the AT 302 or any of the ATs illustrated in FIGS. 1, 3, 12, and/or 13 at block 704. At block 802, immediately prior to tuning away from the call, during a time period less than four subframes (e.g., a second predetermined number of subframes such as 3 subframes or less), the AT 302 forces RL packets to be transmitted as LoLat packets. For example, the AT 302 may force RL packets of all sizes to be LoLat packets. At block 804, if the current RL packet size is larger than that of the RRI payload index 7 (EVDO payload size 7) and a duration of time up to tune-away is less than the termination target of the current LoLat forced RL packet, the AT 302 boosts the T2P by a suitable amount (e.g., 8 dB or more). In one example, a current LoLat forced RL packet may have a termination target of three subpackets, and the time to tune-away is equal to two subpackets (or subframes) that are less than the termination target. In this case, the AT 302 may boost the T2P to increase the chance that the RL packet will be successfully received and terminated in the first attempt. Therefore, a new packet transmission may continue until the last subframe before tune-away for certain data rates.

Figure 9:
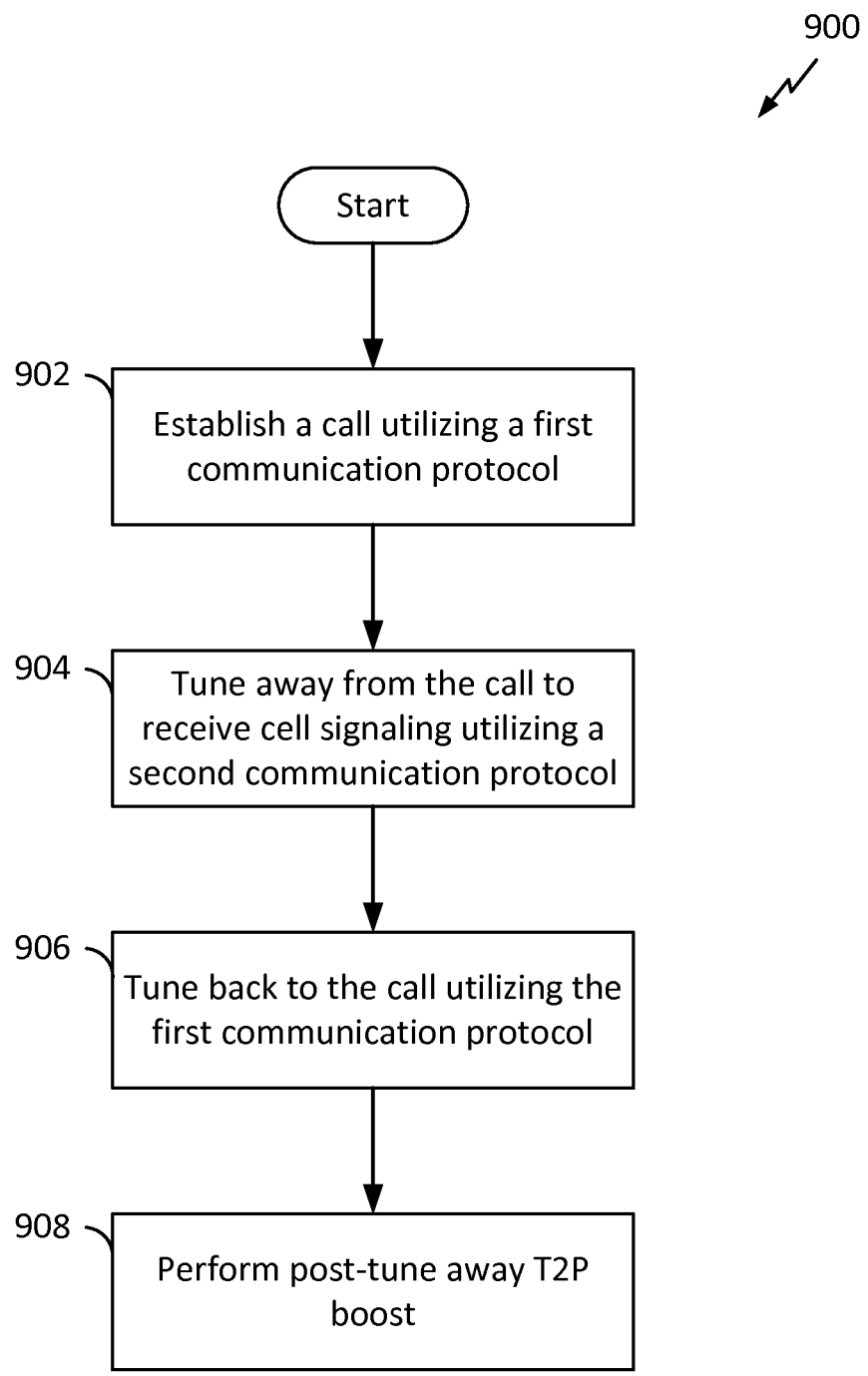
FIG. 9 is a flowchart illustrating a tune-away procedure utilizing post-tune away traffic channel power boost in accordance with an aspect of the disclosure.

In one aspect of the disclosure, an AT 302 may boost T2P for a short period of time right after tune-away. FIG. 9 is a flowchart illustrating a tune-away procedure 900 utilizing post-tune away traffic channel power boost in accordance with an aspect of the disclosure. In one example, the procedure 900 may be performed by the AT 320 or any of the ATs illustrated in FIGS. 1, 3, 12, and/or 13. At block 902, the AT 302 establishes a call utilizing a first communication protocol. For example, the AT 302 may engage in a call with a first cell 304 utilizing the EVDO protocol. At block 904, the AT 302 tunes away from the call to receive cell signaling utilizing a second communication protocol. For example, the AT 302 may tune away to a second cell 306 to receive cell signaling from the second cell 306 utilizing the GSM or 1x protocol. The cell signaling may include paging messages. At block 906, the AT 302 tunes back to the call utilizing the first communication protocol. At block 908, the AT 302 performs post-tune away T2P boost.

Figure 10:
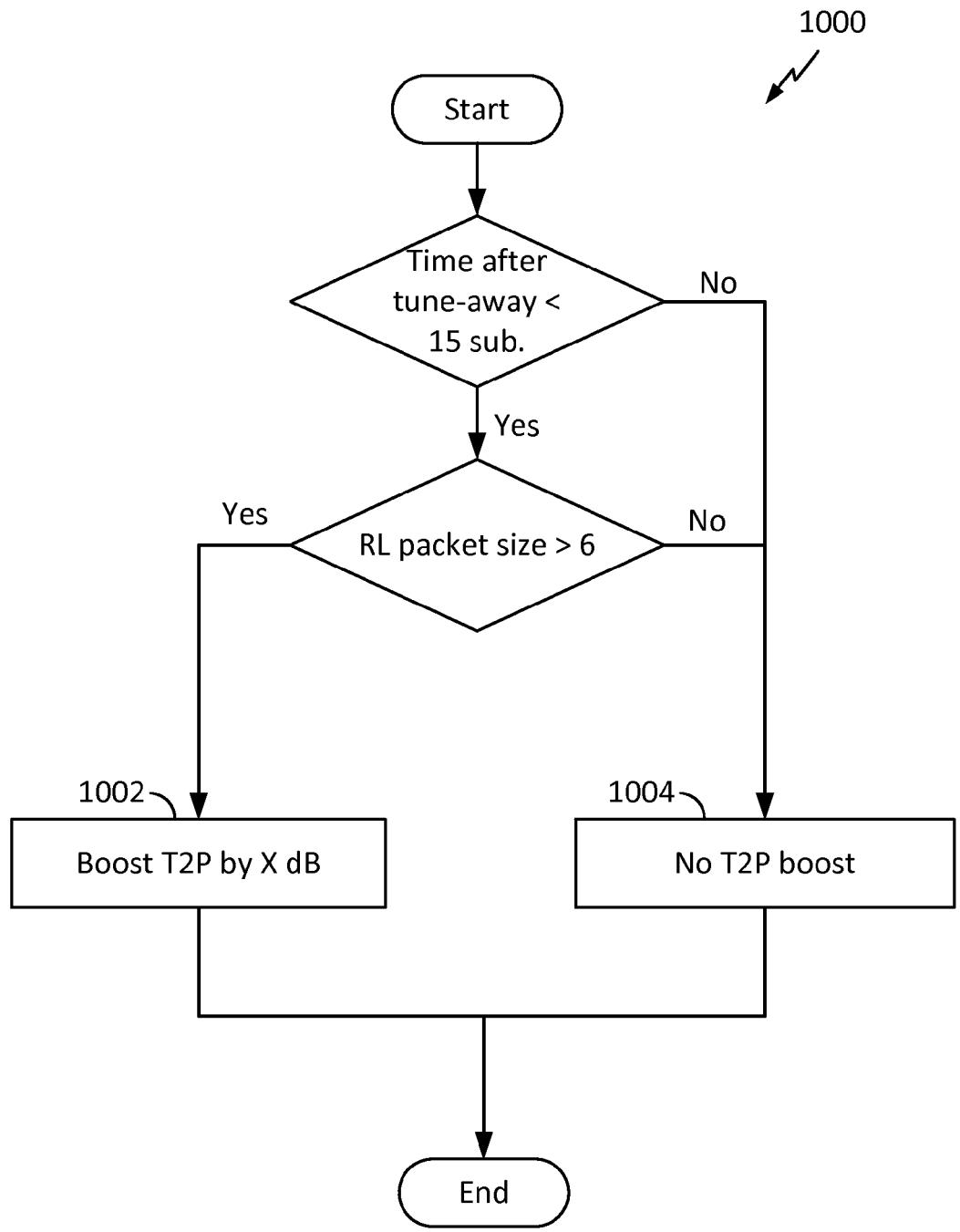
FIG. 10 is a flowchart illustrating a post-tune away traffic channel power boost algorithm in accordance with an aspect of the disclosure.

FIG. 10 is a flowchart illustrating a post-tune away T2P boost algorithm 1000 in accordance with an aspect of the disclosure. For example, the algorithm 1000 may be performed by the AT 302 or any of the ATs illustrated in FIGS. 1, 3, 12, and/or 13 at block 908. At block 1002, if the time after tune-away is within, for example, 15 subframes or a suitable period of time and the current RL packet size is greater than that of RRI index 6, the AT 302 boosts the T2P by X dB. (e.g., 8 dB or some other suitable amount); otherwise, the AT 302 does not boost T2P at block 1004. In general, an RL packet with a size of RRI index 7 or larger will be transmitted as a HiCap packet up to four subpackets. With boosted T2P, the RL packet will likely be successfully transmitted at the first attempt. Therefore, the effective EVDO throughput may be increased after tune-away by T2P boost.

In one aspect of the disclosure, the AT 302 may be configured to support new payload behavior to use larger packet size before and/or after tune-way such that the legacy ramp-down period and/or ramp-up period may be avoided or reduced. For example, the AT 302 may give some priority to the previously transmitted RL packet sizes based on the RRI rate. Therefore, after tune-away, when RL transmission is restarted, the AT 302 may start using larger packet sizes than that would be permitted in the legacy ramp-up behavior. Similarly, the AT 302 may use larger packet sizes than that would be used in the legacy ramp-down before tune-away.

Figure 11:
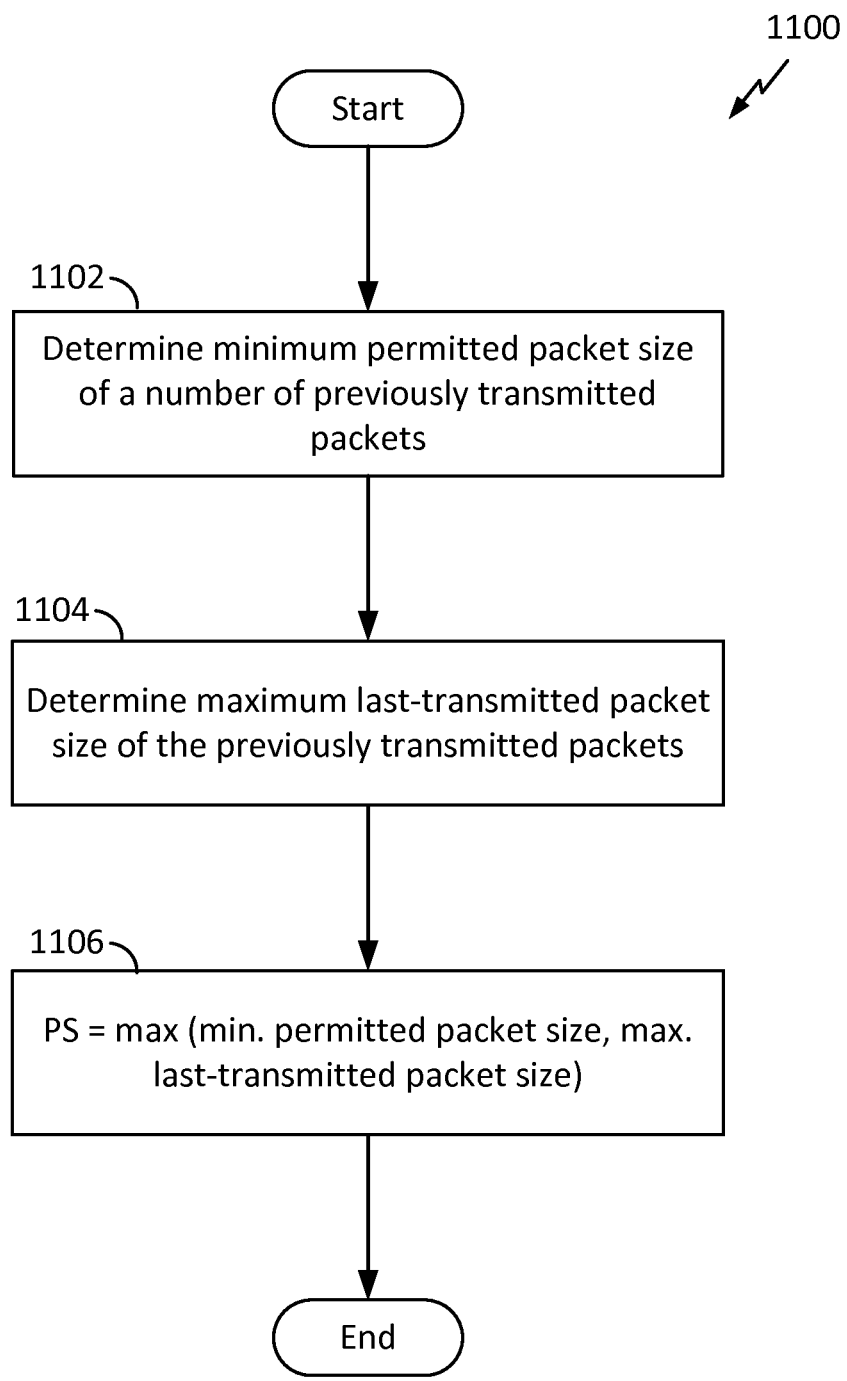
FIG. 11 is a flowchart illustrating a reverse link payload algorithm in accordance with an aspect of the disclosure.

FIG. 11 is a flowchart illustrating a reverse link payload algorithm 1100 in accordance with an aspect of the disclosure. For example, the algorithm 1100 may be performed by the AT 302 or any of the ATs illustrated in FIGS. 1, 3, 12, and/or 13 before and/or after tune-away to permit larger packet size for the next RL packet transmission. At block 1102, the AT 302 determines a minimum permitted packet size from a number of permitted payload packet sizes (e.g., permitted payload packet size 1, permitted payload packet size 2, and permitted payload packet size 3) of a number of previously transmitted packets. For example, the AT 302 may use the permitted payload packet sizes of the last three transmitted packets. At block 1104, the AT 302 determines the maximum previously-transmitted packet size of the previously transmitted packets. In one example, the previously transmitted packet sizes may be the sizes of the last three transmitted packets (last transmitted packet size 1, last transmitted packet size 2, and last transmitted packet size 3).

In another example, the previously transmitted packets may include the packets transmitted during any suitable period.

At block 1106, the AT 302 sets the next RL packet size to be the maximum of the minimum permitted packet size and maximum last transmitted packet size. In this way, the AT 302 will be more likely to use a larger packet size that will result in increased EVDO throughput before and/or after tune-away.

The various procedures for improving EVDO throughput described in FIGS. 5-11 may be implemented individually or in various combinations. Also, the techniques and inventive concepts described are not limited to EVDO, but may be applied to other communication protocols as would be understood by those skilled in the art.

FIG. 12 is a block diagram illustrating an AT 1200 configured to support a plurality of tune-way operations for improving EVDO throughput in accordance with aspects of the disclosure. In one example, the AT 1200 may be the same as the AT 302 or any of the ATs illustrated in FIGS. 1,3, and/or 13, and configured to perform any of the procedures or algorithms illustrated in FIGS. 5-11. In one aspect of the disclosure, the AT 1200 may be an AT that can communicate with an access network in a number of communication protocols such as EVDO, GSM, and 1×. The AT 1200 includes a number of components that may be implemented in software, hardware, firmware, or any combinations thereof. Some examples of the components of the AT 1200 will be described in detail below.

A first protocol communication component 1202 is provided such that the AT 1200 may establish a call (e.g., voice or data call) utilizing a first communication protocol (e.g., EVDO, GSM, or 1×). A second protocol communication component 1204 is provided such that the AT 1200 may establish a call or receive cell signaling utilizing a second communication protocol (e.g., EVDO, GSM, or 1×). In various aspects of the disclosure, the AT 1200 may utilize the communication components 1202 and 1204 to perform the operation described in relation to blocks 502 and 504 of FIG. 5, blocks 702 and 706 of FIG. 7, and blocks 902 and 904 of FIG. 9.

A tune-away control component 1206 is provided such that the AT 1200 may perform the various tune-away procedures described in relation to FIG. 5-11. For example, the AT 1200 may utilize the component 1206 to tune away from an EVDO call to receive cell signaling utilizing GSM/1× protocol. Furthermore, the AT 1200 may utilize the component 1206 to tune back to the EVDO call.

A LoLat forcing component 1208 is provided such that the AT 1200 may force certain RL packets to be transmitted as LoLat packets after a tune-away operation. For example, the component 1208 may be configured to perform the LoLat procedure described in FIGS. 5 and 6. A pre-tune away T2P boosting component 1210 is provided such that the AT 1200 may boost the T2P of certain RL packets before tune-away. For example, the component 1210 may be configured to perform the pre-tune away T2P boost operations described in FIGS. 7 and 8. A post-tune away T2P boosting component 1212 is provided such that the AT 1200 may boost the T2P of certain RL packets after tune-away. For example, the component 1212 may be configured to perform the post-tune away T2P boost operations described in FIGS. 9 and 10.

A payload control component 1214 is provided such that the AT 1200 may use a larger RL packet size as much as possible to increase EVDO throughput before and/or after tune-away. For example, the component 1214 may be configured to give priority to the last transmitted payload packet sizes 1216 (i.e., RRI rates) over the legacy permitted payload packet sizes before and/or after tune-away. In one aspect of the disclosure, the component 1214 may be configured to perform the reverse link payload algorithm of FIG. 11. The AT 1200 also includes software 1220 for configuring the AT 1200 to perform various functions such as those illustrated in relation to FIGS. 5-11. For example, the software 1220 includes codes 1222 for performing tune-away operations between different communication protocols such as EVDO, GSM, and 1×. The software 1220 also includes an RTC-MAC algorithm 1224 that may be configured to perform various functions used to improve EVDO throughput before and/or after tune-away operations as described in relation to FIGS. 5-11.

Figure 13:
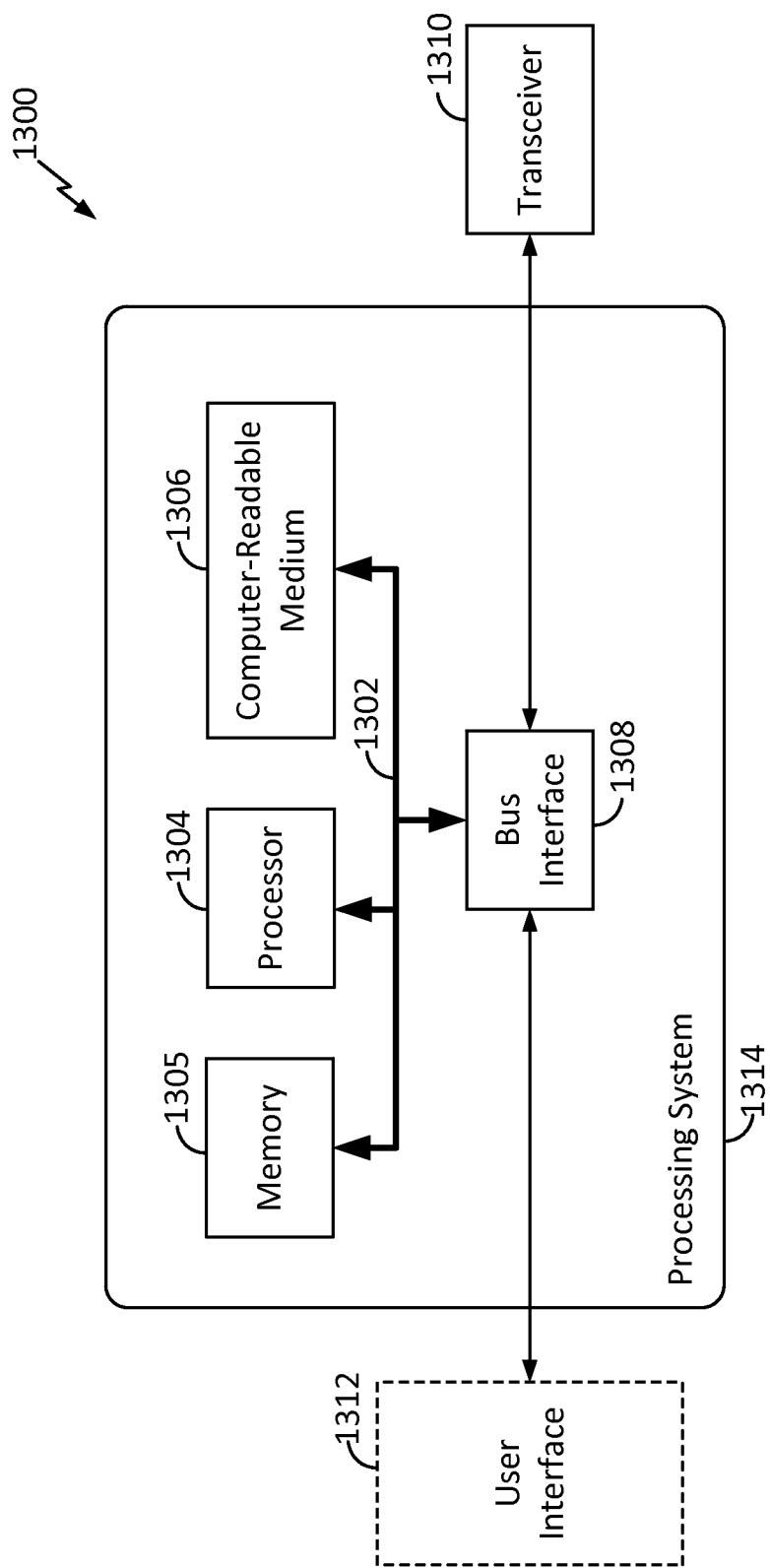
FIG. 13 is a conceptual diagram illustrating an example of a hardware implementation for an apparatus employing a processing system in accordance with an aspect of the disclosure.

FIG. 13 is a conceptual diagram illustrating an example of a hardware implementation for an apparatus 1300 employing a processing system 1314. In accordance with various aspects of the disclosure, an element, or any portion of an element, or any combination of elements may be implemented with a processing system 1314 that includes one or more processors 1304. For example, the apparatus 1300 may be an AT 1200 or any of the ATs illustrated in FIGS. 1,3, and/or 12. In one aspect of the disclosure, the AT 1300 may be configured to implement the components of the AT 1200 described and illustrated in FIG. 12. In another example, the apparatus 1300 may be a base station as illustrated in FIGS. 1 and/or 2. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 1304, as utilized in an apparatus 1300, may be used to implement any one or more of the processes, procedures, or algorithms described and illustrated in FIGS. 5-11.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 links together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides a means for communicating with various other apparatus over a transmission medium. For example, the transceiver 1310 may be configured to support multiple communication protocols such as EVDO, GSM, 1x, etc. The transceiver 1310 may also be configured to support tune-away operations between different communication protocols. Depending upon the nature of the apparatus, a user interface 1312 (e.g., keypad, display, speaker, microphone, joystick, touch screen, touchpad, etc.) may also be provided.

The processor 1304 is responsible for managing the bus 1302 and general processing, including the execution of software stored on the computer-readable medium 1306. The software, for example, software 1220 of FIG. 12, when executed by the processor 1304, causes the processing system 1314 to perform the various functions described in FIGS. 5-11 for any particular apparatus. The computer-readable medium 1306 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306. The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Several aspects of a telecommunications system have been presented with reference to an EVDO system. As those skilled in the art will readily appreciate, various aspects described throughout this disclosure may be extended to other telecommunication systems, network architectures and communication standards.

By way of example, various aspects may be extended to UMTS systems such as W-CDMA, TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods, procedures, or algorithms disclosed is an illustration of exemplary processes. Based upon design preferences, it is understood that the specific order or hierarchy of steps in the methods, procedures, or algorithms may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication operable at an access terminal, comprising:
    establishing a call utilizing a first communication protocol;
    tuning away from the call to receive cell signaling utilizing a second communication protocol;
    tuning back to the call utilizing the first communication protocol; and
    if a packet size of a reverse link (RL) packet is smaller than a first packet size and larger than a second packet size, forcing the RL packet to be transmitted as a low latency (LoLat) packet within a period of time comprising a first predetermined number of subframes from the tuning back.

2. The method of claim 1, wherein the LoLat packet has a termination target of 2 to 3 subpackets.

3. The method of claim 1,
    wherein the first communication protocol is EVDO, and
    wherein the first packet size is EVDO packet size 10, the first predetermined number of subframes is less than 16 subframes, and the second packet size is EVDO packet size 7.

4. The method of claim 1, further comprising:
    prior to tuning away from the call, boosting a traffic-to-pilot power gain (T2P) of a second RL packet based on both a packet size of the second RL packet and a termination target of the second RL packet.

5. The method of claim 4, wherein boosting the T2P comprises:
    if the packet size of the second RL packet is larger than a third packet size, and if a first predetermined period of time immediately prior to tuning away from the call is less than a second predetermined period of time corresponding to the termination target of the second RL packet, boosting the T2P of the second RL packet.

6. The method of claim 5, wherein the third packet size is smaller than the first packet size and larger than the second packet size.

7. The method of claim 4, further comprising:
immediately prior to tuning away from the call, during a second predetermined number of subframes, forcing the second RL packet to be a LoLat packet.

8. The method of claim 1, further comprising:
after tuning back to the call, if the packet size of the RL packet is larger than a third packet size, boosting a traffic-to-pilot power gain (T2P) of the RL packet for a predetermined period of time.

9. The method of claim 1, further comprising:
after tuning back to the call, selecting the packet size of the RL packet based on a maximum packet size of a plurality of RL packets previously transmitted prior to tuning away from the call.

10. An apparatus for wireless communication, comprising:
means for establishing a call utilizing a first communication protocol;
means for tuning away from the call to receive cell signaling utilizing a second communication protocol;
means for tuning back to the call utilizing the first communication protocol; and
means for forcing a reverse link (RL) packet to be transmitted as a low latency (LoLat) packet within a period of time comprising a first predetermined number of subframes from the tuning back, and if a packet size of the RL packet is smaller than a first packet size and larger than a second packet size.

11. The apparatus of claim 10, wherein the LoLat packet has a termination target of 2 to 3 subpackets.

12. The apparatus of claim 10,
wherein the first communication protocol is EVDO, and
wherein the first packet size is EVDO packet size 10, the first predetermined number of subframes is less than 16 subframes, and the second packet size is EVDO packet size 7.

13. The apparatus of claim 10, further comprising:
means for, prior to tuning away from the call, boosting a traffic-to-pilot power gain (T2P) of a second RL packet based on both a packet size of the second RL packet and a termination target of the second RL packet.

14. The apparatus of claim 13, wherein the means for boosting the T2P is configured to:
if the packet size of the second RL packet is larger than a third packet size, and if a first predetermined period of time immediately prior to tuning away from the call is less than a second predetermined period of time corresponding to the termination target of the second RL packet, boost the T2P of the second RL packet.

15. The apparatus of claim 14, wherein the third packet size is smaller than the first packet size and larger than the second packet size.

16. The apparatus of claim 13, further comprising:
means for, immediately prior to tuning away from the call, during a second predetermined number of subframes, forcing the second RL packet to be a LoLat packet.

17. The apparatus of claim 10, further comprising:
means for, after tuning back to the call, if the packet size of the RL packet is larger than a third packet size, boosting a traffic-to-pilot power gain (T2P) of the RL packet for a predetermined period of time.

18. The apparatus of claim 10, further comprising:
means for, after tuning back to the call, selecting the packet size of the RL packet based on a maximum packet size of a plurality of RL packets previously transmitted prior to tuning away from the call.

19. An access terminal, comprising:
a transceiver configured for wireless communication utilizing a first communication protocol and a second communication protocol;
a memory comprising computer executable software; and
a processor operatively coupled to the transceiver and the memory,
wherein the processor is configured by the executable software to:
utilize the transceiver to establish a call utilizing a first communication protocol;
tune away from the call and utilize the transceiver to receive cell signaling utilizing a second communication protocol; and
tune back to the call utilizing the first communication protocol; and
if a packet size of a reverse link (RL) packet is smaller than a first packet size and larger than a second packet size, force the RL packet to be transmitted as a low latency (LoLat) packet within a period of time comprising a first predetermined number of subframes from the tuning back.

20. The access terminal of claim 19, wherein the LoLat packet has a termination target of 2 to 3 subpackets.

21. The access terminal of claim 19,
wherein the first communication protocol is EVDO, and
wherein the first packet size is EVDO packet size 10, the first predetermined number of subframes is less than 16 subframes, and the second packet size is EVDO packet size 7.

22. The access terminal of claim 19, wherein the processor is further configured to:
prior to tuning away from the call, boost a traffic-to-pilot power gain (T2P) of a second RL packet based on both a packet size of the second RL packet and a termination target of the second RL packet.

23. The access terminal of claim 22, wherein the processor is further configured to:
if the packet size of the second RL packet is larger than a third packet size, and if a first predetermined period of time immediately prior to tuning away from the call is less than a second predetermined period of time corresponding to the termination target of the second RL packet, boost the T2P of the second RL packet.

24. The access terminal of claim 23, wherein the third packet size is smaller than the first packet size and larger than the second packet size.

25. The access terminal of claim 22, wherein the processor is further configured to:
immediately prior to tuning away from the call, during a second predetermined number of subframes, force the second RL packet to be a LoLat packet.

26. The access terminal of claim 19, wherein the processor is further configured to:
after tuning back to the call, if the packet size of the RL packet is larger than a third packet size, boost a traffic-to-pilot power gain (T2P) of the RL packet for a predetermined period of time.

27. The access terminal of claim 19, wherein the processor is further configured to:
after tuning back to the call, select the packet size of the RL packet based on a maximum packet size of a plurality of RL packets previously transmitted prior to tuning away from the call.

28. A non-transitory computer-readable medium, comprising code for causing an access terminal to:
- establish a call utilizing a first communication protocol;
- tune away from the call to receive cell signaling utilizing a second communication protocol;
- tune back to the call utilizing the first communication protocol; and
- if a packet size of a reverse link (RL) packet is smaller than a first packet size and larger than a second packet size, force the RL packet to be transmitted as a low latency (LoLat) packet within a period of time comprising a first predetermined number of subframes from the tuning back.

29. The non-transitory computer-readable medium of claim 28, wherein the LoLat packet has a termination target of 2 to 3 subpackets.

30. The non-transitory computer-readable medium of claim 28,
- wherein the first communication protocol is EVDO, and
- wherein the first packet size is EVDO packet size 10, the first predetermined number of subframes is less than 16 subframes, and the second packet size is EVDO packet size 7.

31. The non-transitory computer-readable medium of claim 28, further comprising code for causing the access terminal to:
- prior to tuning away from the call, boost a traffic-to-pilot power gain (T2P) of a second RL packet based on both a packet size of the second RL packet and a termination target of the second RL packet.

32. The non-transitory computer-readable medium of claim 31, wherein the code for boosting the T2P comprises code for causing the access terminal to:
- if the size of the second RL packet is larger than a third packet size, and if a first predetermined period of time immediately prior to tuning away from the call is less than a second predetermined period of time corresponding to the termination target of the second RL packet, boost the T2P of the second RL packet.

33. The non-transitory computer-readable medium of claim 32, wherein the third packet size is smaller than the first packet size and larger than the second packet size.

34. The non-transitory computer-readable medium of claim 31, further comprising code for causing the access terminal to:
- immediately prior to tuning away from the call, during a second predetermined number of subframes, force the second RL packet to be a LoLat packet.

35. The non-transitory computer-readable medium of claim 28, further comprising code for causing the access terminal to:
- after tuning back to the call, if the packet size of the RL packet is larger than a third packet size, boost a traffic-to-pilot power gain (T2P) of the RL packet for a predetermined period of time.

36. The non-transitory computer-readable medium of claim 28, further comprising code for causing the access terminal to:
- after tuning back to the call, select the packet size of the RL packet based on a maximum packet size of a plurality of RL packets previously transmitted prior to tuning away from the call.

* * * * *